Feb. 11, 1958   H. F. NIEDZIELSKI   2,823,277
SERVICE INDICATOR
Filed April 10, 1956
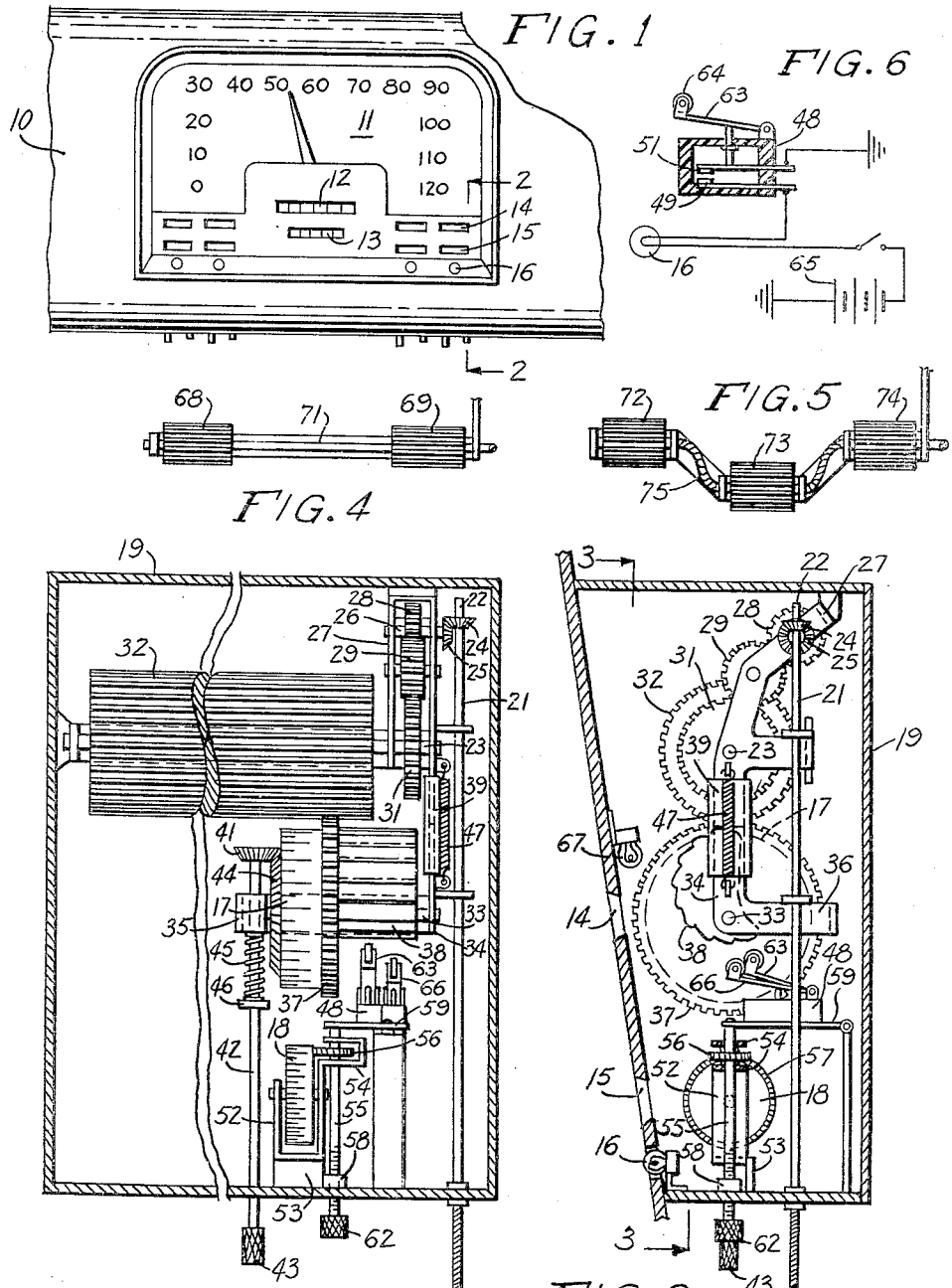
INVENTOR.
HENRY F. NIEDZIELSKI
BY
McMorrow, Berman & Davidson
ATTORNEYS United States Patent Office 2,823,277
Patented Feb. 11, 1958

2,823,277

SERVICE INDICATOR

Henry F. Niedzielski, San Antonio, Tex.

Application April 10, 1956, Serial No. 577,281

3 Claims. (Cl. 200—56)

The present invention relates to a service indicator for mounting in an automobile dash to indicate when a predetermined number of miles have been traveled.

An object of the present invention is to provide a service indicator for an automobile which actuates a signal when a predetermined number of miles have been traveled so that the automobile operator will be informed that a service operation such as changing the oil of the automobile is due.

Another object of the present invention is to provide a service indicator for an automobile in which the signal means indicates a predetermined distance of travel has elapsed and sets into operation a warning signal and then sets into operation a second signal when a second predetermined distance of travel has elapsed to indicate that the prior warning signal has been ignored.

A further object of the present invention is to provide a service indicator for an automobile which lends itself to multiple installation in the dash of the automobile so that several service needs may be registered and separate signals actuated to indicate when each service is due.

A still further object of the present invention is to provide a service indicator for mounting in the dash of an automobile which is sturdy in construction, one which may be reset easily and one which is economically feasible.

These and other objects and advantages of the present invention will be fully apparent from the following description when taken in connection with the annexed drawings, in which:

Figure 1 is a view of a portion of an automobile dash with a speedometer face panel set therein and having a plurality of service indicators of the present invention installed behind the speedometer face panel with signal lights extending therethrough, Figure 2 is a side elevational view of one of the service indicators of the present invention of the assembly of Figure 1, Figure 3 is a front elevational view taken on the line 3—3 of Figure 2, Figure 4 is another form of the drum gear for use in the assembly shown in Figure 1, Figure 5 is still another form of the drum gear for use in the assembly of Figure 1, and Figure 6 is a schematic view of the electrical circuit of the service indicator of the present invention.

Referring in greater detail to the drawing in which like numerals indicate like parts throughout the several views, an automobile dash is shown in Figure 1 and indicated generally by the reference numeral 10 and a speedometer front face panel is shown set into an opening in the dash 10 and is indicated by the reference numeral 11. In addition to the miles per hour indicia and the movable pointer, of conventional style and arrangement, the panel 11 has a slot 12 for viewing the total mileage odometer and another slot 13 for viewing the trip mileage odometer wheels. The panel 11 also has a plurality of paired slots 14 and 15 arranged one over the other and a light bulb 16 projecting through the panel 11 beneath each pair of slots 14 and 15.

Referring to Figures 2 and 3, the slot 14 is seen to permit the viewing of a first indicator wheel 17 while the slot 15 permits the viewing of a second indicator wheel 18.

It is intended that a separate service indicator, constructed according to the present invention, will be installed behind each of the pairs of slots 14 and 15 so that one service indicator may indicate when an oil change is due while the other service indicators will indicate other service requirements such as attention to the automobile battery, greasing of the chassis of the automobile, or such other service as desired. While a plurality of service indicators may be installed behind the panel 11, only one such service indicator will be described. In Figures 2 and 3 it will be seen that a casing 19, which may be the casing which supports the mechanism of the speedometer, is supported on the dash of the automobile and an end portion of an odometer drive shaft, indicated by the reference numeral 21, extends into the casing 19. The connection of the end portion 21 of the odometer drive shaft to the speedometer mechanism is not shown but may be considered to be an extension 22 as shown in Figures 2 and 3.

The service indicator of the present invention comprises a first horizontally disposed driven shaft 23 positioned within the casing 19 adjacent to the odometer drive shaft end portion 21. Means connects the shaft 23 to the odometer drive shaft end portion 21 for rotation by the latter. Specifically, this means consists in a bevel gear 24 on the odometer shaft end portion 21 adjacent the extension 22 and in mesh with a second bevel gear 25 supported upon a short shaft 26 which is journaled in a frame 27. The frame 27 is supported within the casing 19. A gear 28 mounted upon the shaft 26 is in mesh with a second gear 29 which has its shaft also journaled in the frame 27 and is in mesh with a further gear 31 which is fixedly secured to the shaft 23.

A drum gear 32 is carried by the shaft 23 for rotation therewith. A second driven shaft 33 is positioned within the casing 19 in parallel spaced relation with respect to the shaft 23 and has one end supported in the downwardly depending leg 34 of the frame 27 and has its other end supported in a bearing block 35 which is carried by one leg of a U-shaped extension 36 having its other leg secured to the lower end of the leg 34 of the frame 27.

A pinion gear 37 is carried upon the second driven shaft 33 and is in meshing engagement with the drum gear 32. The indicator wheel 17 is positioned on one side of the pinion gear 37 and is circumposed about the adjacent portion of the second driven shaft 33 and is fixedly secured and formed integrally with the pinion gear 37 for rotation therewith.

A cam member 38 is carried by the portion of the second driven shaft 33 on the other side of the pinion gear 37 and is connected to the pinion gear 37 for rotation therewith. The leg 34 of the frame 27 is provided with a slip joint slidable in a sleeve 39 permitting movement of the second driven shaft 33 toward and away from the first driven shaft 23 so that the pinion gear 37 is disengageable from the drum gear 32 by manually operable means. Such means consists in a bevel gear 41 mounted upon the upper end of an upstanding shaft 42 which is journaled intermediate its ends in the bearing block 35 and has its lower end provided with a knurled nut 43 positioned exteriorly of the casing 19. The bevel gear 41 is biased to an out of engagement position with respect to another bevel gear 44 by means of a coil spring 45 circumposed about the adjacent portion of the shaft 42 immediately below the bearing block 35 and held in place by a collar 46 secured to the shaft 42. The bevel gear 44 is formed integrally with the indicator wheels 17 and causes the latter to rotate whenever the shaft 42 is manually rotated. Springs 47 on each side of the sleeve 39 connect the adjacent portions of the leg 34 of the frame 27 together and bias the pinion gear into releasable engagement with the drum gear 32.

A switch 48 is positioned within the casing 19 and has a fixed contact 49 and a movable contact 51 arranged in cooperating relation with respect to the fixed contact 49. Means is provided connecting the switch 48 to the casing 19 for movement toward and away from the cam member 38. Specifically, this means consists in a U-shaped frame 52 having the indicator wheel 18 journaled between its legs and having an L-shaped bracket 53 projecting by one leg from its bight and fixedly secured by its other leg to the casing 19. A horizontally disposed U-shaped bracket 54 is secured to the upper end of the one leg of the frame 52 which is adjacent to the switch 48. An upstanding shaft 55 projects by its lower ends through casing 19 and has its upper end portion rotatably mounted in the U-shaped bracket 54 and carries, between the legs of the U-shaped bracket 54, a pinion gear 56 which is in mesh with a ring gear 57 formed on the adjacent face of the indicator wheel 18. A pinion gear 56 is connected by splines to the shaft 55, the latter being threaded and threadedly mounted in a nut 58 secured to the casing 19. The upper end of the shaft 55 is rotatably connected to a support member 59 which carries the switch 48. A second switch 61 is also carried by the support member 59 and is arranged in parallel abutting relation with respect to the switch 48. The end of the support member 59 remote from the shaft 55 is slidably mounted within a slot formed in the adjacent wall of the casing 19. A knurled nut 62 on the lower end of the shaft 55 provides a manually operable means for rotating the shaft 55 to cause the latter to move the support member 59 and the attached switches 48 and 61 toward and away from the cam member 38.

Each of the switches 48 and 61 are identical and will be described with reference to the switch 48.

A contact arm 63 is arranged in an upwardly sloping direction and is positioned within the casing 19 and has its lower end pivotally connected to the switch 48. The upper end of the contact arm 63 is provided with a roller 64 which is arranged in the path of the rotational travel of the cam member 38 and is engageable with the cam member 38 upon execution of a portion of the rotational travel of the cam member 38 to cause the contact arm 63 to actuate the movable contact 51 and to close the circuit (Figure 6) which includes the light bulb 16 constituting a signal means and the automobile battery 65. The switch 61 has a similar contact arm 66 and similar fixed and movable contacts which, when closed, energize a second light bulb 67 which is preferably colored and causes the indicator wheel 17 to be illuminated when the contact arm 66 is engaged by the appropriate section of the cam member 38.

While here shown as arranged to illuminate the indicator wheel 17, the light bulb 67 may also be mounted within a hole in the panel 11 adjacent to the hole through which projects the first-named light bulb 16 if desired.

Referring to Figure 4, a second form of the drum gear is shown in which two sections 68 and 69 are fixedly secured upon the shaft 71 which takes the place of the first driven shaft 23 and permits the mounting of two or more service indicators at a distance from each other within the casing supporting the speedometer mechanism.

In Figure 5, a third form of the drum gear is shown in which three sections 72, 73, and 74 are mounted in offset relation upon a flexible drive shaft 75 which may also be used to replace the first driven shaft 23 within the casing which supports the speedometer mechanism in which it is desired to have at least three service indicators arranged in offset relation in case the mechanism of the speedometer within its casing and the design of the speedometer face panel requires such an arrangement.

In use, the indicator wheel 18 is manually turned by means of the knurled nut 62 on the lower end of the shaft 55 to set the switches 48 and 61 at a specific distance relative to the cam member 38. The indicator wheel 18 is marked with indicia representing the desired number of miles to be traveled by the automobile before the required service operation. Pulling down upon the knurled nut 43 on the lower end of the shaft 42 will cause the shaft 42 to shift downwardly and engage the bevel gear 41 with the bevel gear 44 and at the same time disengage the pinion gear 37 from its engagement with the drum gear 32. Manual rotation of the knurled nut 43 and the shaft 42 will cause the indicator wheel 17 to rotate so that the same may be set back to zero with the cam member 38 at its position furthest away from the switches 48 and 61. Upon travel of the automobile the required distance as set by the indicator wheel 18 first the switch 48 will be closed by the cam member 38 and will cause the light bulb 16 to be illuminated and to serve as a warning to the automobile operator that the service operation, such as oil change is due. Upon further travel of a specified number of miles as determined by the relative spacings of the contact arm 66 with respect to the contact arm 63, the second light bulb 67 will cause the indicator wheel 17 to be illuminated, serving as a further warning to the automobile operator that the service operation has not been performed and indicating the necessity for prompt action.

While here shown as installed within the casing supporting the speedometer panel 11, the service indicators of the present invention may be installed separately if desired and may be driven by other means than the odometer drive shaft if such other drive means is preferable. The arrangement of the pinion gear 37 with respect to the drum gear 32, or with respect to either of the drum gears shown in Figures 4 and 5, may be subject to the requirements of the space within the casing supporting the speedometer mechanism. It is not intended that the service indicator of the present invention be limited to its arrangement, as here illustrated, within the speedometer casing.

What is claimed is:

1. The combination with a casing supported on the dash of a vehicle and an end portion of an odometer drive shaft extending into said casing, of a service indicator comprising a first horizontally disposed driven shaft positioned within said casing adjacent said odometer drive shaft end portion, means connecting said first shaft to said odometer drive shaft end portion for rotation by the latter, a drum gear carried by said first shaft, a second driven shaft positioned within said casing in parallel spaced relation with respect to said first shaft, a gear carried by said second driven shaft and in meshing engagement with said drum gear, an indicator wheel positioned on one side of said last-named gear and circumposed about the adjacent portion of said second shaft and attached to said last-named gear for rotation therewith, a cam member carried by the portion of said second shaft on the other side of said last-named gear and connected to the latter for rotation therewith, a switch positioned within said casing and having a fixed contact and a movable contact arranged in cooperating relation with respect to said fixed shaft, a contact arm arranged in an upwardly sloping direction positioned within said casing and having the lower end pivotally connected to said switch, the upper end of said arm being provided with means arranged in the path of rotational travel of said cam member and engageable with said cam member upon execution of a portion of its rotational travel to cause said arm to actuate said movable contact.

2. The combination with a casing supported on the dash of a vehicle and an end portion of an odometer drive shaft extending into said casing, of a service indicator comprising a first horizontally disposed driven shaft positioned within said casing adjacent said odometer drive shaft end portion, means connecting said first shaft to said odometer drive shaft end portion for rotation by the latter, a drum gear carried by said first shaft, a second driven shaft positioned within said casing in parallel spaced relation with respect to said first shaft, a gear carried by said second driven shaft and in meshing engagement with said drum gear, an indicator wheel positioned on one side of said last-named gear and circumposed about the adjacent portion of said second shaft and attached to said last-named gear for rotation therewith, a cam member carried by the portion of said second shaft on the other side of said last-named gear and connected to the latter for rotation therewith, a switch having a fixed contact and a movable contact arranged in cooperating relation with respect to said fixed contact positioned within said casing and connected to said casing for movement toward and away from said cam member, a contact arm arranged in an upwardly sloping direction positioned within said casing and having the lower end pivotally connected to said switch, the upper end of said arm being provided with means arranged in the path of rotational travel of said cam member and engageable with said cam member upon execution of a portion of its rotational travel to cause said arm to actuate said movable contact, and manually operable means operatively connected to said switch for effecting the movements of said switch.

3. The combination with a casing supported on the dash of a vehicle and an end portion of an odometer drive shaft extending into said casing, of a service indicator comprising a first horizontally disposed driven shaft positioned within said casing adjacent said odometer drive shaft end portion, means connecting said first shaft to said odometer drive shaft end portion for rotation by the latter, a drum gear carried by said first shaft, a second driven shaft positioned within said casing in parallel spaced relation with respect to said first shaft, and connected to said casing for limited movement toward and away from said first shaft, a gear carried by said second driven shaft and in meshing engagement with said drum gear, an indicator wheel positioned on one side of said last-named gear and circumposed about the adjacent portion of said second shaft and attached to said last-named gear for rotation therewith, a cam member carried by the portion of said second shaft on the other side of said last-named gear and connected to the latter for rotation therewith, a switch positioned within said casing and having a fixed contact and a movable contact in cooperation with respect to said fixed contact, a contact arm arranged in an upwardly sloping direction positioned within said casing and having the lower end pivotally connected to said switch, the upper end of said arm being provided with means arranged in the path of rotation of said cam member and engageable with said cam member upon execution of a portion of its rotational travel to cause said arm to actuate said movable contact.

References Cited in the file of this patent

UNITED STATES PATENTS

| | | |
|---|---|---|
| 2,130,290 | Polta et al. | Sept. 13, 1938 |
| 2,492,408 | Willcox | Dec. 27, 1949 |
| 2,578,358 | Jellison | Dec. 11, 1951 |
| 2,653,205 | Kellenbenz | Sept. 22, 1953 |
| 2,657,285 | Clark et al. | Oct. 27, 1953 |